United States Patent [19]
Spisak

[11] 3,860,296
[45] Jan. 14, 1975

[54] WHEEL TRIM FOR DIFFERENT SIZE WHEELS

[75] Inventor: Edward G. Spisak, Westland, Mich.

[73] Assignee: S & S Product Engineering Service, Inc., Wyandotte, Mich.

[22] Filed: Aug. 2, 1973

[21] Appl. No.: 386,448

[52] U.S. Cl. ........... 301/37 CD, 301/37 R, 301/37 T
[51] Int. Cl. ............................................... B60b 7/00
[58] Field of Search.. 301/37 R, 37 T, 37 C, 37 CD, 301/37 B, 37 SS

[56] References Cited
UNITED STATES PATENTS

| | | | |
|---|---|---|---|
| 2,386,231 | 10/1945 | Lyon | 301/37 CD |
| 2,757,982 | 8/1956 | Lyon | 301/37 R |
| 2,772,924 | 12/1956 | Landell | 301/37 B |
| 2,827,332 | 3/1958 | Chamberlain | 301/37 CD |
| 2,981,566 | 4/1961 | Lyon | 301/37 CD |
| R25,144 | 3/1962 | Lyon | 301/37 SS |

Primary Examiner—M. Henson Wood, Jr.
Assistant Examiner—Victor N. Sakran
Attorney, Agent, or Firm—Hugh L. Fisher

[57] ABSTRACT

A vehicle wheel trim assembly has fastener clips that each have two different wheel engaging and gripping surfaces that engage different parts of vehicle wheels having different sizes and configurations. Single wheel trim can thus be used with several different size wheels. The clips are connected to the wheel trim by means of a flexible ring.

7 Claims, 4 Drawing Figures

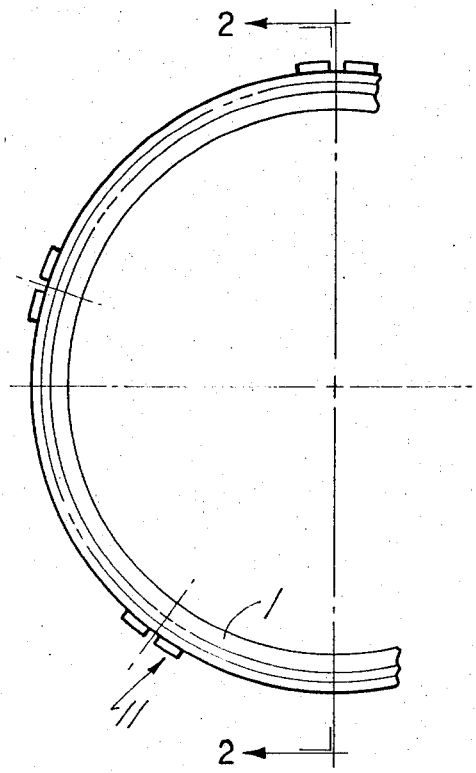
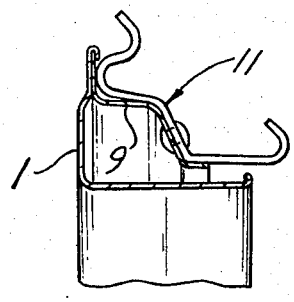
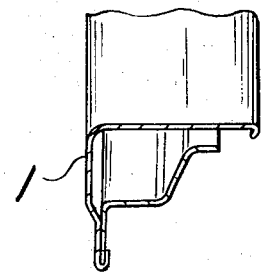
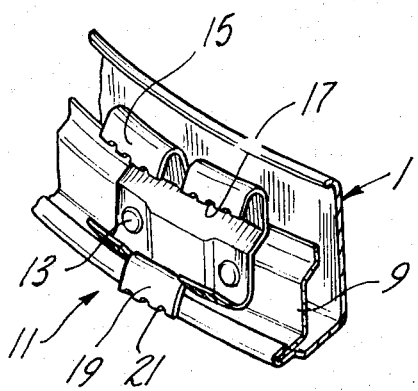
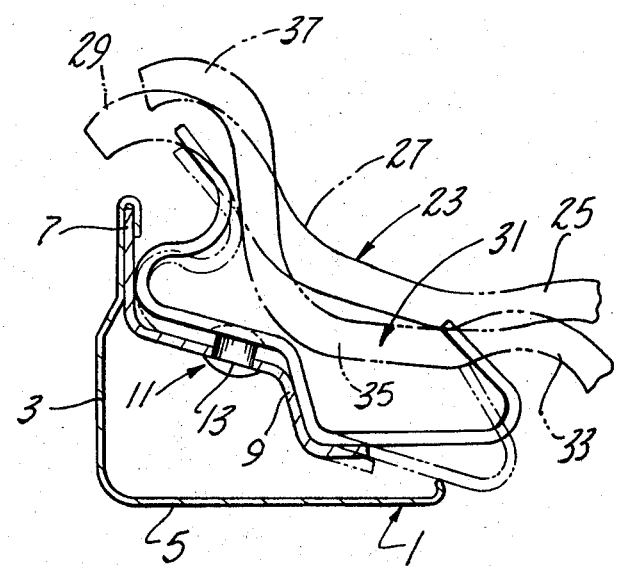
Fig-1
Fig-2
Fig-3
Fig-4

WHEEL TRIM FOR DIFFERENT SIZE WHEELS

This invention relates to trim for vehicle wheels and more particularly to trim adapted to fit on different size wheels.

Conventionally decorative trim rings and covers for wheels are designed to fit a single size wheel having a particular configuration. This requires extra expense in providing different tooling for the manufacture of rings for different size wheels and for maintaining inventory of different rings for different wheels.

It would therefore be desirable and is an object of this invention to provide wheel trim constructed to fit on wheels of different sizes.

This and other objects and advantages will be readily apparent from the following description and accompanying drawins in which:

FIG. 1 is a plan view of a wheel portion of a trim assembly incorporating the invention;

FIG. 2 is an enlarged sectional view taken on the line 2—2 of FIG. 1;

FIG. 3 is a perspective view of the fastener clip attached to the wheel trim; and FIG. 4 is an enlarged sectional view showing how the wheel trim is attached to different size wheels.

The wheel trim assembly includes an outer annular decorative metal ring 1 having a radial portion 3 and an axial portion 5. The radial portion is bent around the end 7 of a generally "s" shaped flexible annular support ring 9. Attached to the support ring 9 at circumferentially spaced locations are wheel engaging and gripping provisions such as a plurality of fastener clips generally indicated 11. The clips are shaped over a portion of their lengths to conform to the cross-sectional shape of the support ring 9. The clips are attached by any suitable means, such as spaced rivets 13.

The fastener clips 11 have a pair of outer curved flange elements 15 having serrated teeth 17 and a single inner curved flange element 19 having similar serrated teeth 21. The inner and outer serrated elements are for engaging and gripping different portions of different size wheels.

Referring now to FIG. 4, there is shown, in broken lines, a section of first tire receiving wheel generally indicated 23 having an inner annular flange 25 connected by a flange 27 to an outer second flange 29. As seen in FIG. 4 the single elements 19 engage and the serrated teeth bite into the outer flange 29 to hold the trim ring in position. It will be noted that the pair of elements 15 also contact the inner flange 25 but this does not constitute the main gripping engagement between the ring and wheel.

A second wheel, generally indicated 31, has a smaller diameter inner flange 33 connected by an intermediate flange 35 to a larger diameter outer flange 37. When inserted into the second wheel rim 31, the inner pair of elements 15 contact the inner flange 33 with the support ring 9 flexing as shown and the teeth 17 biting into the flange. The outer elements 19 are free from contact with the outer flange 37.

When attached to either the wheel 23 or wheel 31 the trim ring can easily be pried off by inserting a tool between the curved outer diameter end of the ring 1 and the respective outer flange of the wheel.

It will be seen that the invention has provided for a simple yet efficient wheel trim construction that is usable with several different size wheels. Modifications and changes will be readily apparent to those skilled in the art. For example, the outer wheel gripping elements could be formed on one set of fastener clips and the inner elements on a second set of clips. Such modifications and changes are within the scope of the invention which is limited only by the following claims:

I claim:

1. Wheel trim for installation on different vehicle wheels each having a different locating surface comprising a plurality of fastener means for attaching the wheel trim either to a first wheel or to a second and different wheel, said fastener means having a first wheel engaging and gripping means adapted to engage a locating surface on the first wheel and a second wheel engaging and gripping means adapted to engage a different locating surface on the second wheel whereby said wheel trim may be secured to either said first or said second wheels.

2. The wheel trim of claim 1 wherein said first wheel locating surface has a larger diameter than the second wheel locating surface and wherein said first and second wheel engaging and gripping means are located relative to each other so as to engage their respective wheels at different relative locations so that the second wheel engaging and gripping means does not interfere with the first wheel when the first wheel engaging means is in operative engaging and gripping relationship with the second wheel.

3. The wheel trim of claim 1 further including a flexible support ring and wherein said fastener means resiliently attached to the wheel trim by a flexible support ring whereby the first and second wheel engaging means can flex relative to their respective wheels when attached thereto.

4. A wheel trim assembly for attachment either to a first size wheel having an inner flange of one diameter connected by an intermediate portion to an outer flange of another diameter larger than the inner flange or to a second size wheel having an inner flange having a diameter greater than the corresponding diameter of the inner flange of the first wheel connected by an intermediate portion to an outer flange having a diameter less than the corresponding diameter of the outer flange of the first wheel, the assembly including a wheel trim having a plurality of wheel fasterner clips adapted to be joined thereto each fastener clip having a first wheel engaging element adapted to contact the inner flange of the first wheel and a second wheel engaging element adapted to contact the outer flange of the second wheel.

5. The wheel trim of claim 4 wherein each of the wheel engaging elements have serrated teeth adapted to grip the respective flange to retard removal.

6. The wheel trim of claim 5 further including a flexible annular ring secured to the wheel trim and having the fastener clips secured thereto.

7. The wheel trim of claim 4 wherein said fastener clips each have a spaced pair of said first wheel engaging elements.

* * * * *